United States Patent [19]

Takeuchi et al.

[11] Patent Number: 5,620,783

[45] Date of Patent: Apr. 15, 1997

US005620783A

[54] TRANSFER PAPER FOR OUTPUTTING COLOR IMAGES AND METHOD OF FORMING COLOR IMAGES BY USING SAME

[75] Inventors: Tatsuo Takeuchi, Kawasaki; Masahiro Inoue, Yokohama; Jiro Ishizuka, Machida, all of Japan

[73] Assignee: Canon Kabushiki Kaisha, Tokyo, Japan

[21] Appl. No.: 128,724

[22] Filed: Sep. 30, 1993

[30] Foreign Application Priority Data

Mar. 30, 1992 [JP] Japan .................................... 4-283423

[51] Int. Cl.[6] ........................................ B32B 3/00

[52] U.S. Cl. ......................... 428/211; 428/195; 428/402; 428/409; 428/537.5

[58] Field of Search ................................ 428/537.5, 409, 428/402, 145, 195, 211; 503/225; 156/244.11; 162/181.1–181.8

[56] References Cited

U.S. PATENT DOCUMENTS

| | | | |
|---|---|---|---|
| 2,941,964 | 6/1960 | Houston et al. . | |
| 2,941,965 | 6/1960 | Ingram . | |
| 3,066,382 | 12/1962 | Zweigle et al. . | |
| 3,251,728 | 5/1966 | Humbert et al. . | |
| 3,841,903 | 10/1974 | Huang et al. | 117/138.8 F |
| 3,961,000 | 6/1976 | Ropiequet . | |
| 4,265,978 | 5/1981 | Morishita et al. | 428/537 |
| 4,472,227 | 9/1984 | Toyoda et al. | 156/244.11 |
| 4,599,269 | 7/1986 | Kohaut et al. . | |
| 4,863,655 | 9/1989 | Lacourse et al. . | |
| 4,900,620 | 2/1990 | Tokita et al. | 428/330 |
| 5,000,891 | 3/1991 | Green . | |
| 5,013,709 | 5/1991 | Ogawa et al. | 503/225 |
| 5,035,930 | 7/1991 | Lacourse et al. . | |
| 5,043,196 | 8/1991 | Lacourse et al. . | |
| 5,153,037 | 10/1992 | Altieri . | |

FOREIGN PATENT DOCUMENTS

| | | |
|---|---|---|
| 0087847 | 9/1983 | European Pat. Off. . |
| 0437961 | 7/1991 | European Pat. Off. . |
| 0507554 | 10/1992 | European Pat. Off. . |

*Primary Examiner*—William Krynski
*Attorney, Agent, or Firm*—Fitzpatrick, Cella, Harper & Scinto

[57] ABSTRACT

Transfer paper for outputting color images, suitable for use as a transfer member used in a color electrophotographic apparatus capable of forming a multi-color toner image by using at least two colors of single-color toner. The paper has a whiteness degree of 85% or more and an opaqueness degree of 90% or more. A method of forming a color image includes the steps of transferring a color toner image to transfer paper having a whiteness degree of 85% or more and an opaqueness degree of 90% or more, and heatingly fixing the color toner image.

8 Claims, 2 Drawing Sheets

TRANSFER PAPER FOR OUTPUTTING COLOR IMAGES AND METHOD OF FORMING COLOR IMAGES BY USING SAME

BACKGROUND OF THE INVENTION

1. Field of the Invention

The present invention relates to transfer paper used in a color copying machine, in particular, a color electrophotographic apparatus having a double-side output capability, and to a method of forming color images by using the transfer paper.

2. Description of the Related Art

In recent years, an apparatus having full-color output capability and comprising a reader section R for reading a manuscript and a printer section P for outputting images in accordance with manuscript read signals, as shown in FIG. 1, is generally a type of laser printer. An image formation sequence of the apparatus in a case of a full-color mode will be explained briefly. Referring to FIG. 1, when a photosensitive drum 2 is rotated in the direction of an arrow B, a photosensitive member on the photosensitive drum 2 is uniformly charged by a charger 3. Next, image exposure is performed by a laser light E modulated in accordance with a yellow image signal of the color separation signals of a manuscript read by the reader section R, and an electrostatic latent image is thus formed. Next, as a rotor 4*a* rotates, the latent image is developed by a yellow developer 4Y which is moved to and fixed beforehand at a development position.

Next, a transfer member housed within a cassette 101 or 102 is taken out of the cassette by a paper feeding roller 103 or 104, respectively. Further, the transfer member which has been passed through a paper feeding guide 4A, a paper feeding roller 106, and then a paper feeding guide 4B, is held by a gripper 6 at a predetermined timing, and then electrostatically wound around a transfer drum 8 by an abutment roller 7 and an electrode facing the abutment roller 7. The transfer drum 8 is rotated in the direction of an arrow A in synchronization with the photosensitive drum 2. The visual image developed by the yellow developer 4Y is transferred by a transfer charger 9 at a place where the outer peripheral surface of the photosensitive drum 2 abuts the outer peripheral surface of the transfer drum 8. The transfer drum 8 continues to rotate as it is so as to be ready for the transferring of the next color (magenta in FIG. 1).

The electric charge of the photosensitive drum 2 is eliminated by a charger 10 for eliminating electric charge. After the photosensitive drum 2 is cleaned by cleaning means 11, it is charged again by a primary charger 3 and undergoes such image exposure as described above in accordance with the next magenta image signal. A rotary developing apparatus then rotates while an electrostatic latent image is formed on the photosensitive drum 2 in accordance with a magenta image signal as a result of the above-mentioned image exposure in order to position a magenta developer 4M at the above-mentioned predetermined development position and perform a predetermined magenta development. Then, the above-described process is performed for cyan and black colors. When the transfer of four colors has been completed, the electric charge of the four-color visual image formed on the transfer member is eliminated by the charger 10 and 13. Then, the transfer member is released by the gripper 6, is separated from the transfer drum 8 by a separation claw 14 and the transfer member is sent to a fixer 16 by a transport belt 15. The transfer member is then fixed by heat and pressure in the nip spacing formed by a fixing roller 161 whose surface is heated by a heating roller 163 and formed by a pressure roller 162, and then the transfer member is ejected onto a tray 17, thus completing a series of full-color print sequences. After the fixing roller 161 has finished fixing the transfer member, the roller is cleaned by a cleaning web 164 so as to be prepared for the next fixing operation.

In forming color images using chromatic color toners based on such an electrophotographic method to reproduce a great number of colors, as described above, toners which are coloring powder of yellow, magenta, cyan and black are stacked on the transfer member in multiple layers, and a toner resin is melted by fixing so as to be mixed, that is, color mixing, thereby achieving the above purpose. For this reason, unlike printing using printing ink, a considerable amount of coloring pigment is placed on the paper which is a transfer member, thus causing the external-light shielding power to increase. Under such conditions, as regards a transfer member which can be used in a conventional full-color electrophotographic apparatus as paper formed from chemical pulp, there has been a demand that the transfer member has a proper degree of whiteness which serves as a base for color reproduction, is able to provide a low thermal capacity in which the above-mentioned color mixture by heating is possible, and has a volume resistivity in which electrostatic transferring of at least three times is possible, and having sufficient flexibility to allow the transfer member to be electrostatically wound around the transfer drum. These conditions may be satisfied by using plain paper, which paper generally has a whiteness degree of 85% or more, opaqueness degree of 85% or less, a volume resistivity of $1\times10^{10}$ to $10\times10^{11}\Omega\cdot$cm (20° C., 65%), a stiffness of 17 to 22 cm (JIS P-8143 A process) though the plain paper has a weight slightly greater than that of ordinary black and white electrophotographic paper. The value of stiffness is measured in the following way. The length from the grasping portion to the leading edge of a test piece when the direction in which the leading edge of the test piece is hung and bent becomes an opposite direction if it is rotated 90° with the grasp line as an axis when one end of the test piece having a long thin, fixed shape is grasped and held upward, is the value of the stiffness.

However, in a case in which a full-color image of only one surface is formed using the apparatus shown in FIG. 1 by use of the above-mentioned conventionally used paper, when a full-color image is formed nevertheless on both sides of the paper, there is the possibility that a color tone of the image on a second surface will be considerably affected depending upon the presence or absence of toner on the first surface of the paper when the paper is raised by the hiding power of the toner. Further, since the color of the first surface is made visible in the form of a watermark on a white portion on the second surface even if the first surface is a single image having a uniform density, chroma from a halftone portion to a highlight portion deteriorates considerably. Further, since the toner on the first surface is melted because fixing is performed twice, the toner deeply penetrates the paper, causing offset to increase.

SUMMARY OF THE INVENTION

It is an object of the present invention to provide transfer paper which is usable for a heating color-mixing type color image forming apparatus employing toner and particularly suitable for forming images on both sides of the paper, such paper being specialized for both-side use which does not produce considerable offset even when heat fixing is performed twice.

It is another object of the present invention to provide a method of forming color images in which no offset is produced.

The transfer paper for outputting color images in accordance with the present invention has a whiteness degree of 85% or more and a opaqueness degree of 90% or more.

The whiteness degree is a value measured by a method prescribed in JIS P8123, which value being represented by a percentage (%) of the reflectance when blue to violet light of the spectrum is irradiated to a sample by using a Hunter whiteness degree tester with respect to the reflectance obtained when the same light is irradiated to a standard magnesium oxide plate.

The opaqueness degree is a value measured by a method prescribed in JIS P8123. More specifically, the sample is backed up by a white and black standard plate, respective reflectances are measured via a green filter, the percentage (%) of the former with respect to the latter is represented as an opaqueness degree. A sample of 100% opaqueness degree is completely opaque paper. By using transfer paper having such whiteness or opaqueness degree, a color image having excellent color reproducibility and a small amount of offset can be formed. A transfer member is provided for a color electrophotographic apparatus capable of forming a multicolor toner image by use of at least two colors of single-color toner which comprises a transfer paper for outputting color images having a whiteness degree of 85% or more and an opaqueness degree of 90% or more, said paper containing 65 wt. % of chemical pulp.

Objectives and advantages in addition to those discussed above shall be apparent to those skilled in the art from the description of the preferred embodiment of the invention which follows. In the description, reference is made to the accompanying drawings, which form a part hereof, and which illustrate examples of the invention. Such examples, however, are not exhaustive of the various embodiments of the invention, and therefore reference is made to the appended claims for determining the scope of the invention.

DESCRIPTION OF THE PREFERRED EMBODIMENTS

Figure 1:
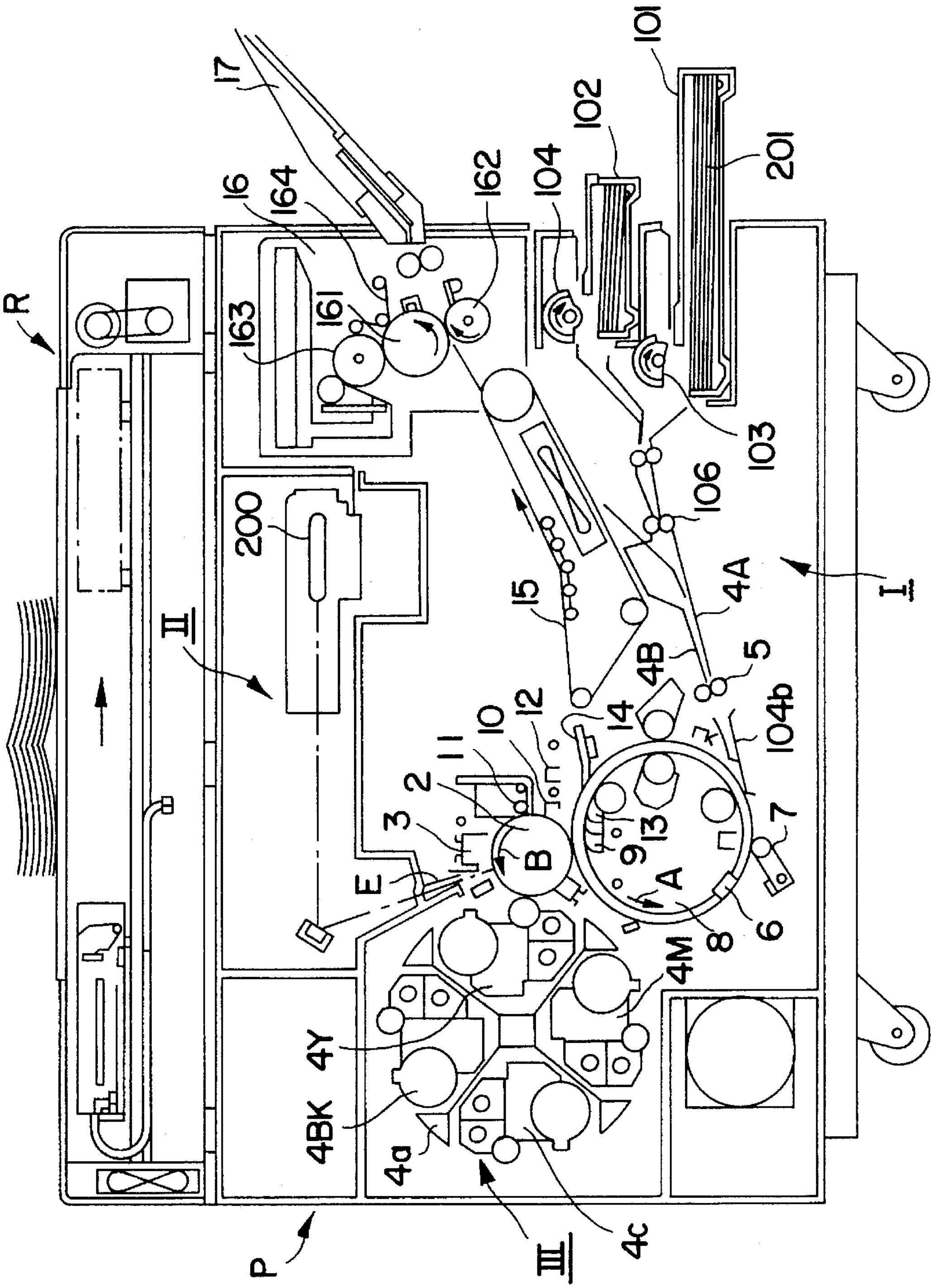
FIG. 1 is a schematic, longitudinal sectional view of a full-color electrophotographic copying machine in which the transfer paper for outputting color images in accordance with present invention can be used.

It is preferable that transfer paper in accordance with the present invention be manufactured by adjusting the content of the fine white powder and the weight of the paper. Fine white powder is used to manufacture paper by mixing it with pulp, mixing it with a surface sizing material as surface processing components, or using it as a surface coating material. The content of the fine white powder is preferably 4 g or more per 1 $m^2$ of the paper. The fine white powder is preferably capable of reflecting light of the entire wavelength in the visible light region.

The weight of the paper is preferably 90 $g/m^2$ or more, and more particularly 100 $g/m^2$ or more. The degree of whiteness can be made 90% by using fluorescent whitening dye in paper. Since such paper has a small internal scattering factor, the opaqueness is low, approximately 87%. When a patch image is formed by magenta, cyan, and yellow toners of an intensity of 1.6, and red, green and blue toners (made from a combination of two of the above magenta, cyan or yellow toners) on the image on the first side, and observed from the second side, than all six colors can be identified. The smaller the weight of the paper, the smaller the thermal capacity, and therefore color mixing by heating and melting toner can be efficiently performed. When this is done, the weight is preferably not more than 120 $g/m^2$. There is an advantage in that this weight can be set at a small value by making opaqueness 90% or more by using fine white powder. The content of the chemical pulp which is a base material for the transfer member in accordance with the present invention is preferably 65 wt. % or more.

Paper of 65 wt. % or more is preferable since it prevents the toner itself from being melted too much by the two-time fixing step for both sides of the paper and the paper fibers cannot be penetrated, though it depends upon the heat melting characteristics of the toner used for forming color images.

The total amount of the content filler for increasing the degrees of opaqueness and whiteness is preferably 12 wt. % or more and, more preferably 14 wt. % or more. Preferably 4 $g/m^2$, or more preferably 6 $g/m^2$ of fine white powder is contained in this amount. White pigment, such as titanium oxide, magnesium oxide, magnesium sulfate, or calcium carbonate, may preferably be used as the fine white powder. The particle size of the powder contained is preferably from 200 nm to 50 μm in terms of the average volume particle size and, more preferably, not more than 10 μm. The lower limit for the particle size may be that which allows powder in the form of secondary aggregated particles to be present. As primary particles, aggregatable particles, 20 mm or more in size, may be used.

Regarding the contained form, classification may be made according to the finished form. Plain paper may be diffused uniformly along the thickness by internally adding paper raw material. When an objective paper in the form of a coated paper is to be obtained, a pulp raw-material and a coated layer may be separately added, or paper to which this powder is added may be used in the final coating.

When the transfer paper of the present invention is used to form a color image, sharp melt toner having a low softening point and a low melt viscosity is used because there is a demand for excellent melting properties and color mixing properties when heat is applied. This is because use of such sharp melt toner makes it possible to widen the range in which colors of a copy are reproduced, and to obtain a color copy close to the broad range of colors of the manuscript or a full-color image.

Such sharp melt toner is manufactured by melt kneading, grinding, and classifying materials for forming toner, such as a binding resin like polyester resin or styrene-acrylic ester resin, a coloring agent (dye, sublimating dye), or a charge control agent. If necessary, an external addition step for adding various external addition agents (e.g., hydrophobic colloidal silica) to a toner may be performed. For such a color toner, use of a polyester resin as a binding resin is particularly preferred when binding and sharp melt properties are considered. An example of a sharp melt polyester resin is a high polymer compound having ester binding in the principal chain of molecules synthesized from a diol compound and carboxylic acid.

In particular, a polyester resin which has bisphenol represented by the following formula:

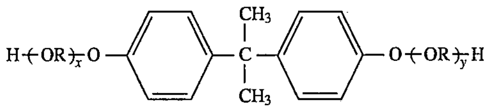

(R is the ethylene or propylene group, x and y are each a positive integer of 1 or more, and the average value of x+y is from 2 to 10), or a polyester resin which has a substituted product thereof as diol components, is preferable because the polyester resin has sharp melting characteristics, in which divalent or higher-valence carboxylic acid, acid anhydride thereof, carboxylic acid components thereof formed of lower alkyl ester (e.g., fumaric acid, maleic acid, maleic acid anhydride, phthalic acid, terephthalic acid, trimellitic acid, or pyromellitic acid) are at least copolycondensed. The softening point of the polyester resin is preferably 75° to 150° C. and, more preferably, 80° to 120° C.

Figure 2:
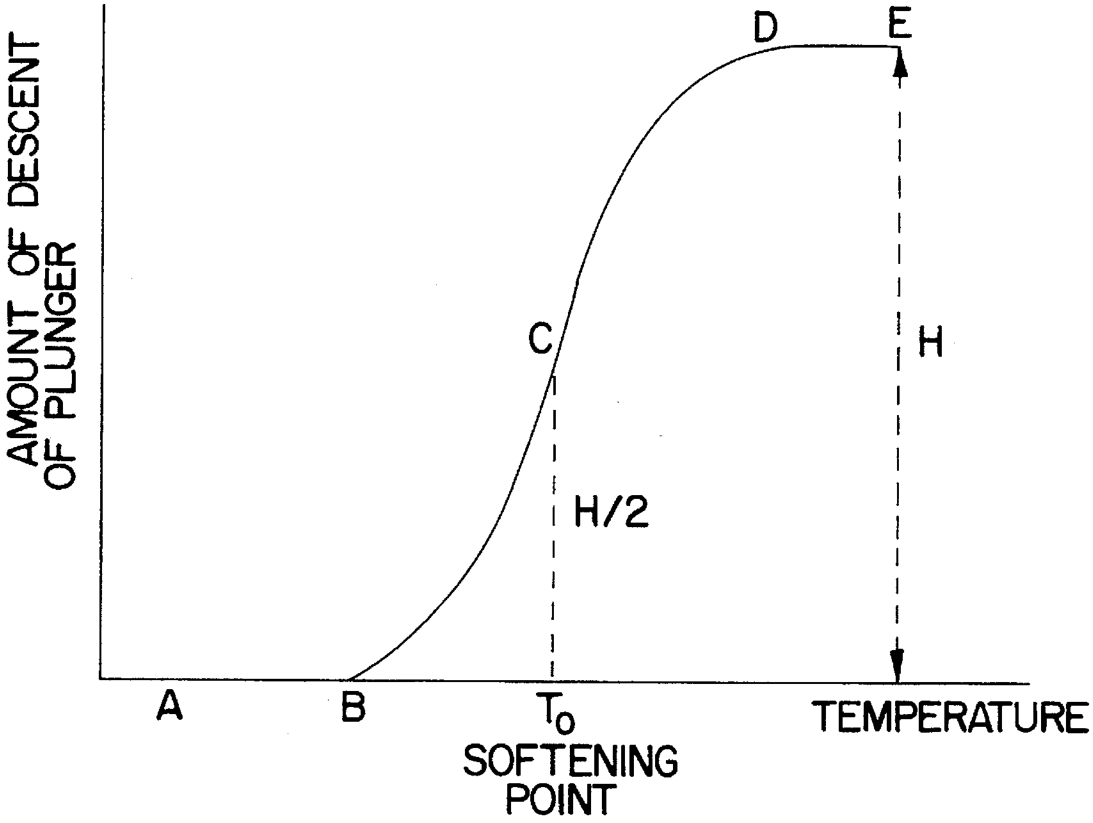
FIG. 2 is a graph illustrating the softening characteristics of sharp melt toner.

An example of the softening characteristics of the sharp melt toner containing this polyester resin as a binding resin is shown in FIG. 2. The measuring conditions are as follows.

The CFT-500A type flow tester (manufactured by Shimazu Corp.) was used. The amount of the plunger descent amount/temperature curve (hereinafter referred to as a softening S-shape curve) of the toner was determined, when a die (nozzle) was 0.2 mm in diameter and 1.0 mm in thickness, an extrusion load of 20 kg was applied, at an initial set temperature of 70° C., heated at an even speed of 6° C./minute after a lapse of 300 seconds of warming up. One (1)g to three (3)g of precisely weighed fine powder was used to sample the toner. The cross section of the plunger was set to 1.0 $cm^2$. The softening S-shape curve becomes the curve shown in FIG. 2. As it is heated at an even speed, the toner is heated gradually, and begins to flow out (the plunger descends A→B) . Further, when the temperature increases, a substantial amount of molten toner flows out (B→C→D), the plunger stops descending and terminates (D→E).

The height H of the S-shape curve indicates the total amount of flowout, and the temperature T0 corresponding to the C point of H/2 indicates the softening point of the toner. Whether the toner and the binding resin have sharp melt properties can be determined by measuring the apparent melt viscosity of the toner and the binding resin. Toners and binding resins having sharp melt properties are ones which satisfy the following conditions, when the temperature at which the apparent melt viscosity shows $10^3$ poise is denoted as T1, and the temperature at which the apparent melt viscosity shows $5\times10^2$ poise is denoted as T2:

T1=90° to 150° C.

$|\Delta T|=|T1-T2|=5°$ to 20° C.

The sharp melt resin having these temperature/melt viscosity characteristics has a feature that when it is heated, the viscosity thereof decreases very sharply. Such decrease in viscosity causes the uppermost toner layer to be appropriately mixed with the bottommost toner layer, causes the transparency of the toner layer itself to increase sharply, thereby causing satisfactory color subtraction mixing.

EXAMPLE 1

Paper having a thickness of 135 μm and weighing 130 $g/m^2$ was made by using raw-material pulp containing 16 wt. % filler in 75 wt. % chemical pulp, 8 wt. % titanium oxide used as a white pigment having a particle size of 5 μm, and having kaolin, and a rosin size or the like was added. It was confirmed that 7 $g/m^2$ of titanium oxide powder was contained in the finished product. The opaqueness of the paper was 94%, the whiteness degree 87%, and the air permeability 16 seconds. Next, in the full-color copying machine shown in FIG. 1, three color toners yellow, cyan and magenta, each of which has sharp melt properties, are adjusted so that the reflection density becomes 1.6 after being heat fixed, and the above three colors and three colors of blue, green and red as secondary colors are outputted in the form of a square patch whose one side is 30 mm. This image is color-identified visually from the surface opposite to the image. Three sheets of unused paper produced as described above were placed as a pad under the image. Regarding six color tones, yellow and other five colors could be barely identified visually, and the contour of the square patch was obscure. When an image was successively formed on the second side, satisfactory images on both sides were obtained without being affected by the image on the first side. The air permeability is a value measured by a method prescribed by JIS P8123, and is the time required for 100 ml of air to pass through an area of 645 $mm^2$.

Comparative Example 1

In comparison with the first embodiment, when a paper of an effective weight of 95 $g/m^2$ without containing titanium oxide was made so that paper of an opaqueness degree of 83%, a whiteness degree of 81% and an air permeability of 14 seconds can be obtained, and a six color patch similar to that described above was formed, it was possible to identify six colors from among all six colors. When a uniform yellow image with a reflection density of 0.8 was formed as the image on the second side, it was confirmed that the color was partially smeared by the color of the patch on the first side, and a blue patch portion became slightly blackened.

EXAMPLE 2

In comparison with the first embodiment, a raw material containing 4 wt. % titanium oxide having a particle size of 10 μm was produced, a paper was made therefrom, having a density paper of 100 $g/m^2$. The opaqueness degree of the was 92%, the whiteness degree thereof 85% and the air permeability thereof was 15 seconds. When an image was similarly formed on this paper, the number of identifiable patches was two. When a solid image of a yellow density of 0.8 was formed on the second side, it was nearly impossible to identify patches on the first side, there were no variations in the yellow color tone and thus a practical level was obtained.

EXAMPLE 3

Paper weighing 75 $g/m^2$ and containing 3 $g/m^2$ of calcium carbonate powder was used as a base paper. By coating a coating solution of 50 wt. % magnesium oxide to 50 wt. % starch on both sides of the paper so that each paper weighs 10 $g/m^2$ when finished, a coating paper was obtained. As the total amount, 13 wt. % of fine white powder was contained. When finished, the opaqueness degree of the paper was 97%, the whiteness degree thereof was 86% and the air permeability thereof was 3,300 seconds. When the same image as in Example 1 was formed on this paper and offset was seen, each patch was concealed, and it was impossible to identify the patches, and no influence was exerted upon the image on a second side of the paper.

Comparative Example 2

A raw material containing 20 wt. % of mechanical pulp within 60 wt. % of chemical pulp, in which 4 wt. % talc was internally added as a filler, as well as a sizing agent, starch and the like, was used to make paper having a thickness of 125 μm and weighing 100 $g/m^2$. The opaqueness degree of the paper was 92% and the whiteness degree thereof was 78%.

When an experiment for outputting an image similar to Example 1 was carried out on this paper, since the paper itself became blackened, the color tone of the image on a first side of the paper could hardly be observed from the rear side. However, since the whiteness degree of the paper itself was low, the yellow color decreases, and the quality as a full-color image decreased.

Comparative Example 3

Paper was made which contains 60 wt. % chemical paper, 25 wt. % mechanical paper, and 6 wt. % calcium carbonate and talc as a filler, as well as starch and a sizing agent and water. The paper is 90 μm thick and weighs 75 $g/m^2$. The opaqueness degree of this paper was 78%, and the whiteness degree thereof was 80%.

When an experiment for outputting an image, similar to Example 1, was performed on this paper, the quality as a full-color image decreased because the paper itself became blackened and yellowed on a first side of the paper. Further, when a solid image having a yellow density of 0.6 was printed on a first side of the paper, and when a solid image having a blue image density of 0.3 was formed on a second side on the image of the second side, the second one was not blue but gray. It was determined to be an unsuitable paper for a full color on both sides of the paper.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims. The following claims are to be accorded the broadest interpretation, so as to encompass all such modifications and equivalent structures and functions.

What is claimed is:

1. Transfer paper for outputting color images, suitable for use as a transfer member in a color electrophotographic apparatus capable of forming a multi-color toner image by using at least two colors of single-color toner, said paper being uncoated plain paper having a whiteness degree of 85% or more and an opaqueness degree of 90% or more.

2. Transfer paper according to claim 1, wherein the opaqueness thereof is 92% or more.

3. Transfer member for a color electrophotographic apparatus capable of forming a multi-color image by use of at least two colors of single-color toner which comprises a transfer paper for outputting color images having a whiteness degree of 85% or more and an opaqueness degree of 90% or more, said paper being uncoated plain paper containing 65 wt. % of chemical pulp.

4. Transfer paper according to any one of claims 1 or 2, containing fine white powder in amounts of at least 4 $g/m^2$.

5. Transfer paper according to claim 4, wherein said fine white powder is formed of at least one material selected from the group consisting of titanium oxide, magnesium oxide, magnesium sulfate, and calcium carbonate.

6. Transfer paper according to any one of claims 1 to 3, having a weight from $90/gm^2$ to 120 $g/m^2$.

7. Transfer paper according to claim 4, wherein the weight of said transfer paper is from 90 $g/m^2$ to 120 $g/m^2$.

8. Transfer paper according to claim 5, wherein the weight of said transfer paper is from 90 $g/m^2$ to 120 $g/m^2$.

* * * * *

UNITED STATES PATENT AND TRADEMARK OFFICE
CERTIFICATE OF CORRECTION

PATENT NO. : 5,620,783

DATED : April 15, 1997

INVENTOR(S) : TATSUO TAKEUCHI, ET AL.

It is certified that error appears in the above-identified patent and that said Letters Patent is hereby corrected as shown below:

On the title page, item:

[30] FOREIGN APPLICATION PRIORITY DATA

"Mar. 30, 1992 [JP] Japan ... 4-283423" should read --Sep. 30, 1992 [JP] Japan ... 4-283423--.

COLUMN 3

Line 8, "a" should read --an--; and
Line 48, "present" should read --the present--.

COLUMN 4

Line 7, "than" should read --then--; and
Line 55, "melt kneading," should read --melt-kneading,--.

COLUMN 6

Line 43, "paper" should be deleted and "the" should read --the paper--.

COLUMN 7

Line 7, "92%" should read --92%,--.

Signed and Sealed this

Second Day of December, 1997

Attest:

Bruce Lehman

BRUCE LEHMAN

Attesting Officer

*Commissioner of Patents and Trademarks*

UNITED STATES PATENT AND TRADEMARK OFFICE
CERTIFICATE OF CORRECTION

PATENT NO. : 5,620,783

DATED : April 15, 1997

INVENTOR(S) : TATSUO TAKEUCHI, ET AL.

It is certified that error appears in the above-identified patent and that said Letters Patent is hereby corrected as shown below:

COLUMN 3

Line 17, "JIS P8123" should read --JIS P8138--.

Signed and Sealed this

Twenty-fourth Day of March, 1998

*Attest:*

BRUCE LEHMAN

*Attesting Officer*

*Commissioner of Patents and Trademarks*